US006473942B1

United States Patent
Caveney et al.

(10) Patent No.: US 6,473,942 B1
(45) Date of Patent: Nov. 5, 2002

(54) CABLE TIE WITH THREAD FORCE REDUCING STRUCTURE

(75) Inventors: Jack E. Caveney, Hinsdale, IL (US); James A. Brownlee, Park Forest, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/855,261

(22) Filed: May 15, 2001

(51) Int. Cl.[7] .............................................. B65D 63/00
(52) U.S. Cl. .................... 24/16 PB; 24/17 A; 24/30.5 P
(58) Field of Search ........................... 24/16 PB, 17 AP, 24/30.5 P; 248/74.3; 411/437

(56) References Cited

U.S. PATENT DOCUMENTS

| 3,186,047 A | | 6/1965 | Schwester et al. |
| 3,408,699 A | | 11/1968 | Reynolds |
| 3,457,598 A | | 7/1969 | Mariani |
| 3,486,200 A | | 12/1969 | Orenick |
| 3,488,813 A | | 1/1970 | Kohke |
| 3,490,104 A | | 1/1970 | Kabel |
| 3,837,047 A | * | 9/1974 | Bunnell ..................... 24/16 PB |
| 4,875,647 A | | 10/1989 | Takagi et al. |
| 5,193,251 A | | 3/1993 | Fortsch |
| 5,317,787 A | | 6/1994 | Fortsch |
| 5,513,421 A | * | 5/1996 | Wells ........................ 24/16 PB |
| 5,517,727 A | | 5/1996 | Bernard et al. |
| 5,517,728 A | | 5/1996 | Woods |
| D372,665 S | | 8/1996 | Kim |
| 5,621,949 A | * | 4/1997 | Wells et al. ............... 24/16 PB |
| 5,630,252 A | | 5/1997 | Wells |
| 5,774,944 A | | 7/1998 | Choi |
| 5,781,975 A | | 7/1998 | Wells, Jr. et al. |
| 5,815,891 A | | 10/1998 | Students et al. |
| 5,890,265 A | | 4/1999 | Christian et al. |
| 6,076,234 A | | 6/2000 | Kohkhar et al. |
| 6,279,203 B1 | * | 8/2001 | Hundley et al. .......... 24/16 PB |

* cited by examiner

Primary Examiner—Victor Sakran
(74) Attorney, Agent, or Firm—Robert A. McCann; Jay A. Saltzman; Christopher S. Clancy (57) ABSTRACT

A cable tie is provided having a lowered cable strap insertion force. The cable tie includes a strap with a first end and a free end, a locking head having a strap accepting channel, and a metal locking device mounted within a metal locking device receiving cavity of the head having a fixed end mounted to a support of the locking head and a free end positioned within the strap accepting channel. The locking head includes a recessed pocket provided between the fixed end and the strap accepting channel that defines a reduced thickness support membrane that allows controlled deflection of the fixed end to achieve lower strap insertion force. By making the recessed pocket open into the metal locking device receiving cavity, molding and aesthetic advantages can be achieved.

19 Claims, 7 Drawing Sheets

CABLE TIE WITH THREAD FORCE REDUCING STRUCTURE

BACKGROUND OF THE INVENTION

1. Field of Invention

The present invention relates generally to a low thread force cable tie, and more particularly to a relief structure that allows for reduced resistance to threading for a cable tie with a metal locking device.

2. Description of Related Art

Plastic cable ties having metal locking device inserts are well known in the art. Examples of such include U.S. Pat. No. 3,457,598 to Mariani and U.S. Pat. No. 5,517,727 to Bernard et al.

Cable ties of this type include a metal locking device partially embedded at an angle within a strap accepting channel of a cable tie head. The metal locking device is situated at an angle that allows insertion of a cable tie strap in an insertion direction, but allows for engagement of the locking device with the strap when it is pulled in a removing direction to prevent removal. The metal locking device of such conventional cable ties is in the form of a cantilevered beam that is fixed at one end and extends into the strap accepting channel at the free end.

Resistance to insertion in such cable ties is limited by the flexibility of the metal locking devices. Most conventional cable ties have a solid support section in the region of the fixed end of the metal locking device. Prior attempts to reduce insertion force have resulted in use of thinner metal locking devices, which while reducing insertion force have the undesirable affect of reducing the locking force of the cable tie. As such, these are usually undesirable.

One prior attempt at reducing insertion force while retaining loop tensile strength can be found in U.S. Pat. No. 5,517,727 to Bernard et al. In this cable tie, a cored out pocket is provided on the external surface of the locking head adjacent the fixed end. This allows for a slight rotation of the fixed end of the metal locking device during insertion of the strap, which lowers insertion force by reducing resistance to rotation. However, the pocket is only taught to be made external.

There is a need for an improved locking device that can provide better resistance to removal while achieving a low insertion force.

There also is a need for a low insertion force cable tie having a clean, aesthetic exterior appearance.

SUMMARY OF THE INVENTION

It is an object of the invention to provide a cable tie utilizing a metal locking device that has improved retention strength and a low insertion force.

The above and other objects are achieved by a cable tie comprising a strap including a first end and a free end, a locking head secured to the first end of the strap, and a metal locking device. The locking head including an end wall, an inner wall and side walls that define a strap accepting channel in the head. The strap accepting channel has a strap entry end and a strap exit end. The locking head further includes a metal locking device receiving cavity adjacent to and open toward the strap exit end of the locking head. The metal locking device is mounted within the metal locking device receiving cavity by having a fixed end mounted to the end wall of the locking head and a free end positioned within the strap accepting channel. The locking head includes a recessed pocket provided between the fixed end of the metal locking device and the strap accepting channel that opens to the metal locking device receiving cavity. The recessed pocket defines a thinned support membrane immediately adjacent the fixed end of the metal locking device that allows for slight rotation of the fixed end toward the strap accepting channel when feeding the strap through the strap accepting channel, which reduces strap insertion force.

The invention also provides a method of making a cable tie comprising the steps of: molding a cable tie with a first end and a free end and a locking head secured to the first end of the strap, the locking head including an end wall, an inner wall and side walls that define a strap accepting channel in the head, the strap accepting channel having a strap entry end and a strap exit end, the locking head further including a metal locking device receiving cavity adjacent to and open toward the strap exit end of the locking head that includes a recessed pocket; and inserting a metal locking device into the metal locking device receiving cavity and mounting one end of the locking device into the end wall of the locking head closely adjacent to the recessed pocket such that the recessed pocket is situated between the metal locking device and the strap accepting channel and a support membrane of a predetermined thickness is formed between the locking device and the recessed pocket, a free end of the metal locking device being positioned within the strap accepting channel.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

An inventive cable tie 100 will be described with reference to FIGS. 1–15. Cable tie 100 includes a locking head 102 and a strap 104. Cable tie 100 can be made from various materials as known in the art. Suitable materials include by way of example, nylon, polypropylene, and various fluoropolymers. Cable tie 100 can be formed in various sizes and lengths to suit a particular application as also known in the art. Obviously, desired loop tensile strength is one factor when selecting sizing of the strap, locking head and other components.

Figure 1:
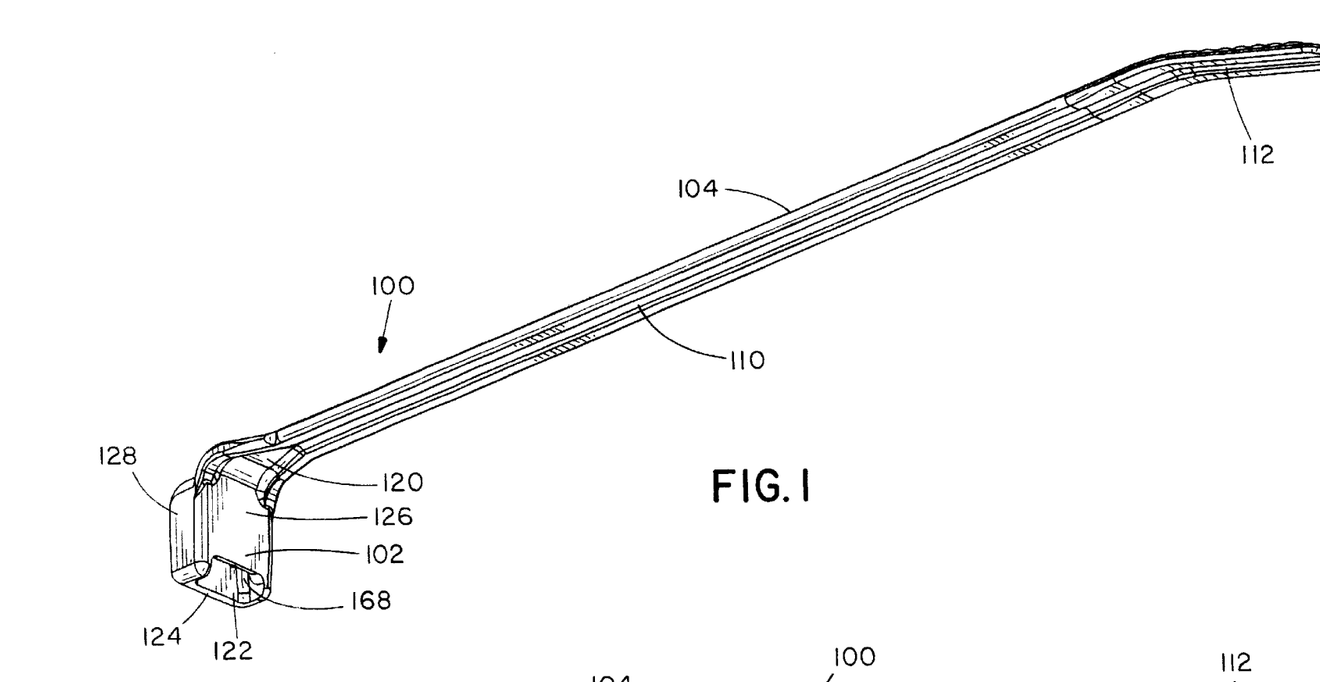
FIG. 1 is a bottom perspective view of a cable tie according to the present invention.
Figure 2:
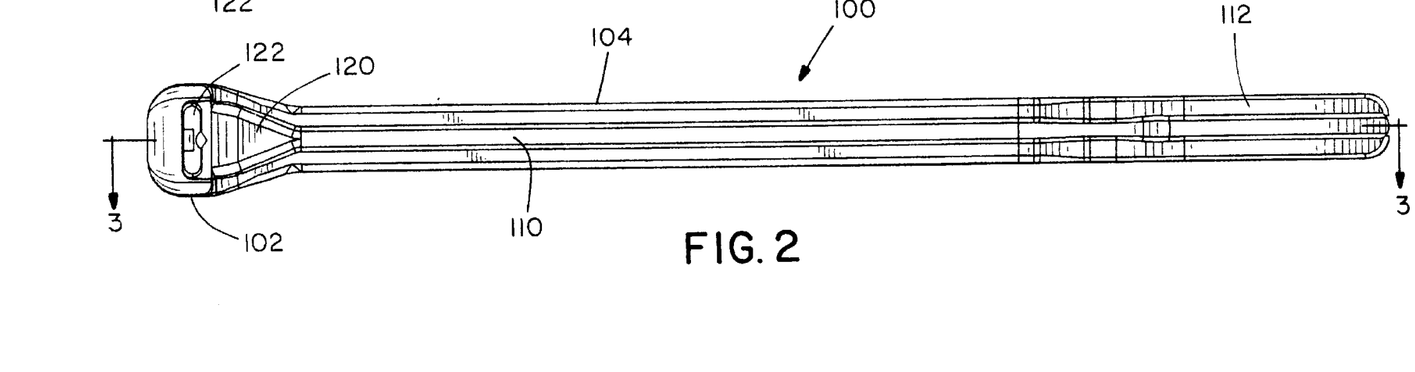
FIG. 2 is a bottom view of a cable tie according to the invention.
Figures 3, 4, 5, 6A, 6B:
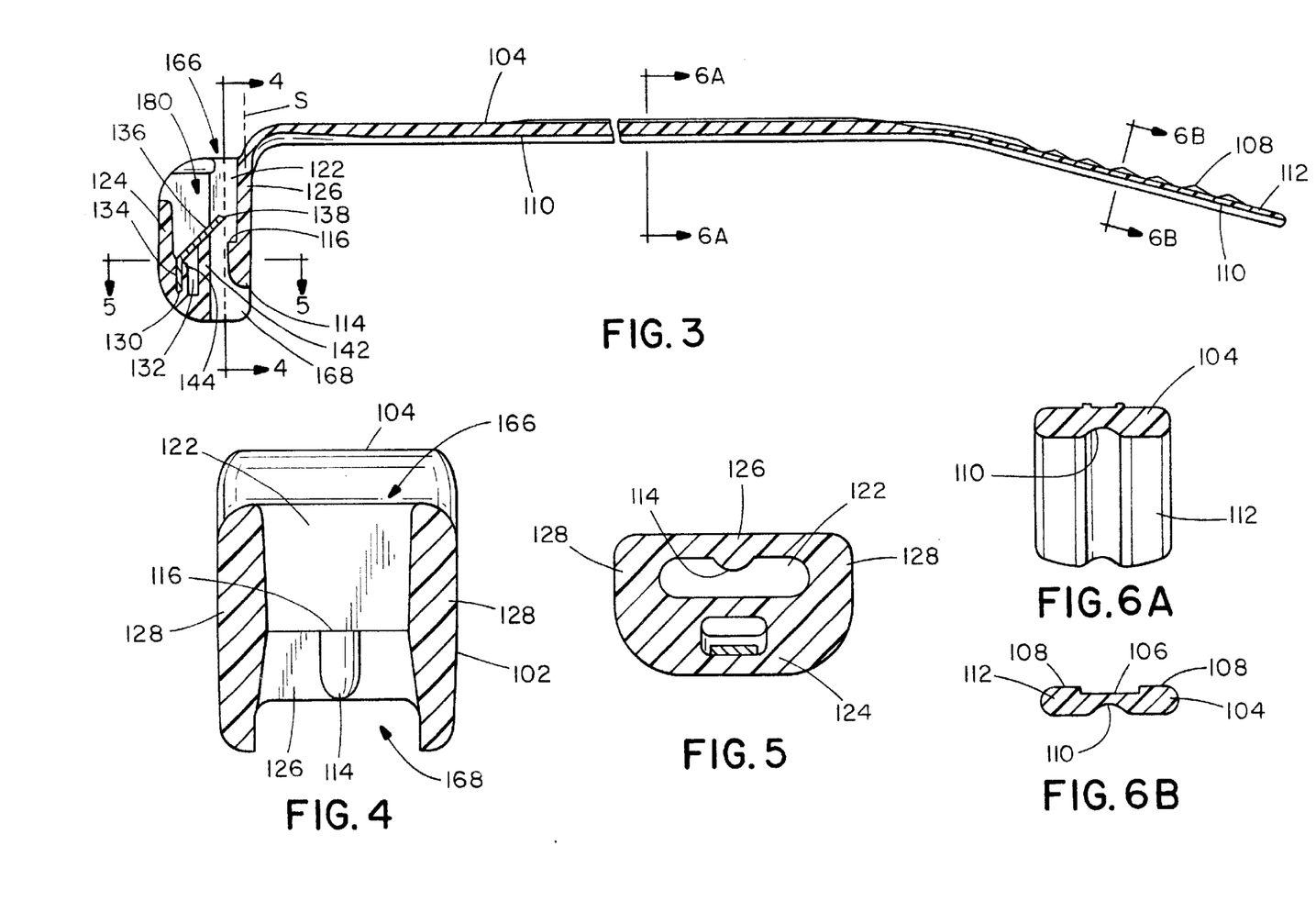
FIG. 3 is a cross-section view of the cable tie of FIG. 2 taken along line 3—3.
FIG. 4 is a cross-sectional view of a locking head of the cable tie of FIG. 3 taken along line 4—4.
FIG. 5 is a cross-sectional view of the locking head of FIG. 3 taken along line 5—5.
FIG. 6A is a cross-sectional view of a strap of the cable tie according to a first embodiment of the invention taken along line 6A—6A of FIG. 3.
FIG. 6B is a cross-sectional view of a strap of the cable tie according to a second embodiment of the invention taken along line 6B—6B of FIG. 3.

Strap 104 may be provided with a longitudinally extending central groove 110 on the inside surface as well as well as a central slot 106 on the outside surface of the leading end (see FIGS. 6A–B). Central groove 110 may taper at the end of the strap adjacent locking head 102 to form an increased width, such as by providing a V-groove 120 as best shown in FIGS. 1–2. Strap 104 may also include gripping ridges 108 (see FIG. 3) on the outside surface of an angled and tapered leading end 112 of strap 104.

Locking head 102 includes a strap accepting channel 122 and a locking device receiving cavity 180. Strap accepting channel 122 receives the leading end 112 of strap 104 during use. Strap accepting channel 122 has a strap entry end 168 through which strap 104 is first inserted and a strap exit end 166 (see FIG. 3). As best shown in FIG. 5, strap accepting channel 122 is formed by an end wall 124, inner wall 126, and side walls 128 (see FIG. 5). Strap accepting channel 122 has a predefined width and may be provided with a support guide 114 with ledge 116 protruding from inner wall 126.

Locking device receiving cavity 180 is provided to allow access to an anchoring region on end wall 124 for partial embedding of metal locking device 136 in end wall 124 to define a cantilever beam structure having a fixed end 134 and a free end 138 that extends into strap accepting cavity 122. Metal locking device receiving cavity 180 also allows for movement of locking device 136. A support slot 130 is optionally preformed in an inner surface of end wall 124 or else is inherently formed as a result of embedding fixed end 134 into the surface of end wall 124.

The metal locking device is preferably formed from a corrosion resistant metal such as stainless steel as known in the art. While metal locking device 136 may take a conventional straight form, it is preferably bent or formed so that free end 138 (mounted end) is at a predetermined angle relative to fixed end 134. It is also preferable for fixed end 134 to be substantially parallel to the axis of strap accepting channel 122. This allows for easier insertion of locking device 136 into cavity 180 and embedding of the fixed end 134 into the surface of end wall 124. In any case, free end 138 extends into the strap accepting channel at an acute angle relative to the axis of strap accepting channel 122 facing strap exit end 166. Free end 138 extends into channel 122 by a distance to sufficiently engage strap 104 and prevent withdrawal of the strap from the channel. Free end 138 of metal locking device 136 is supported at a fulcrum point at an upper edge 142 of end wall 124.

Several factors determine both the strap insertion force and the cable strap retention force. A primary factor is the thickness and flexibility of metal locking device 136. As most conventional metal locking devices are formed from stainless steel, the material properties can be considered a constant and the critical factor becomes the thickness. Also, the free length of metal locking device 136 is a factor along with the amount of interference of the free end of the locking device 136 and the strap within the strap accepting channel. A reduction of metal thickness can have an effect on insertion force. However, a reduction of metal thickness also reduces cable strap retention force, which is undesirable. As such, another variable is desirable that can reduce insertion force without decreasing cable strap retention force.

One such variable is a weakening of the support at the fixed end of metal locking device 136. This is preferably achieved by forming a recessed pocket 132 adjacent support slot 130, between fixed end 134 and strap accepting channel 122. Recessed pocket 132 should be positioned a predetermined distance inboard of fixed end 134 to define a support membrane 144 with a predetermined reduced thickness. The thickness of support membrane 144 will control the amount of deflection achievable by locking device 136. An exemplary thickness of support membrane 144 is about 0.01–0.02" for most applications.

Recessed pocket 132 is preferably formed in the interior of locking head 102 adjacent metal locking device receiving cavity 180. There are both molding and aesthetic advantages to formation of such an internal recessed pocket. By forming recessed pocket 132 internally, the exterior surfaces of locking head 102 can remain smooth to prevent sharp molding edges and to prevent snagging of the cable tie on adjacent objects. Additionally, by having an internal pocket, formation by molding can be easily achieved. Besides functional advantages this also achieves an aesthetic advantage of a cleaner locking head design. It should be noted that while an internal recessed pocket 132 is shown for example in FIG. 7 as opening to the metal locking device receiving cavity, it is also contemplated that benefits of the invention can be achieved with the recessed pocket being open to the strap entry end of the locking head. In this case the recessed pocket would extend from a wall formed between the tops of support membrane 144 and wall 142.

It is preferable for recessed pocket 132 to extend at least the entire depth of the fixed end 134 and more preferable to extend a distance slightly below support slot 130 as shown. In the case of use of the bent metal locking device, recessed pocket 132 is preferably parallel to strap accepting channel 122. It is also preferable, but not necessary, for the recessed pocket to have a uniform thickness. Molding advantages can also be achieved by formation of a recessed pocket that extends fully through inner wall 124 to form a through hole (not shown).

Recessed pocket 132 is sized to accommodate a desired deflection of fixed end 134 of metal locking device 136. However, the pocket 132 should not be sized so large that it dramatically reduces the strength of the wall forming fulcrum point 142, which would affect the holding strength of the strap.

Figure 7:
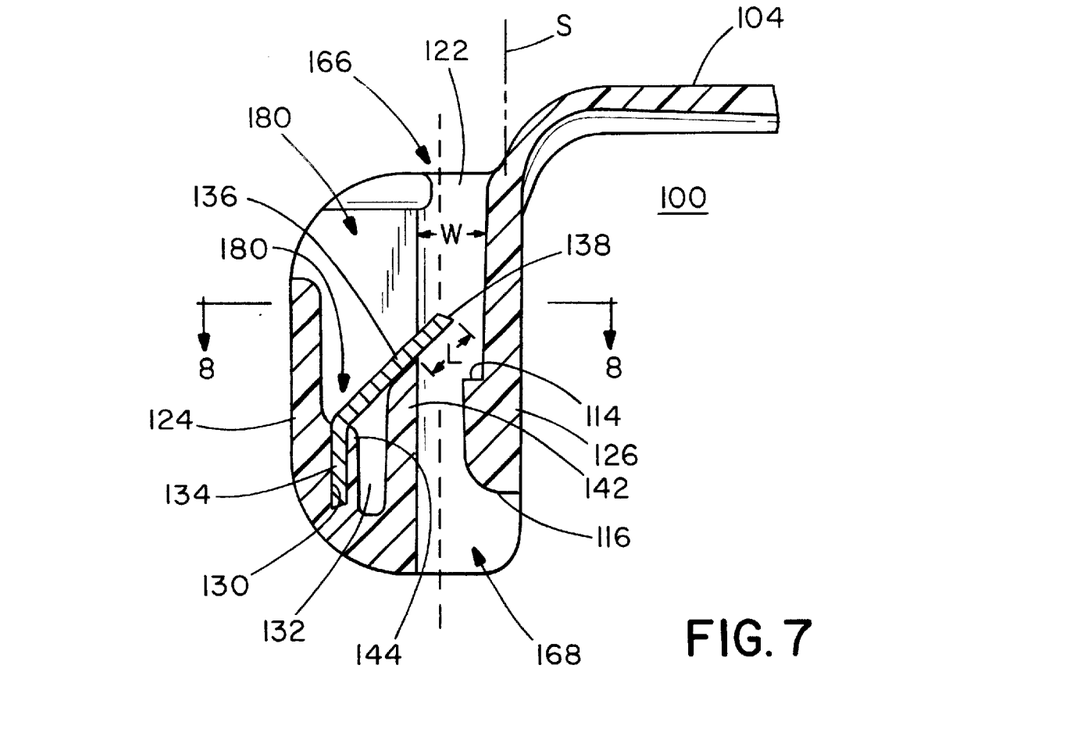
FIG. 7 is an enlarged view of the locking head of FIG. 3.

While cable tie 100 is shown to have a locking head with a strap accepting channel substantially parallel to a strap attachment axis S, which is shown for example in FIGS. 3 and 7 as being defined by the region where the strap attaches to the head, and also having a strap that is bent at approximately 90° from strap axis S, the cable tie is not limited to such a configuration and may take other forms. For example, the cable tie 100 may have a straight strap that continues to extend substantially along strap attachment axis S. Additionally, cable tie 100 may have a more conventional right angle locking head such as that shown in Bernard et al. '727, that has a strap accepting channel at a right angle to strap attachment axis S.

Figure 8:
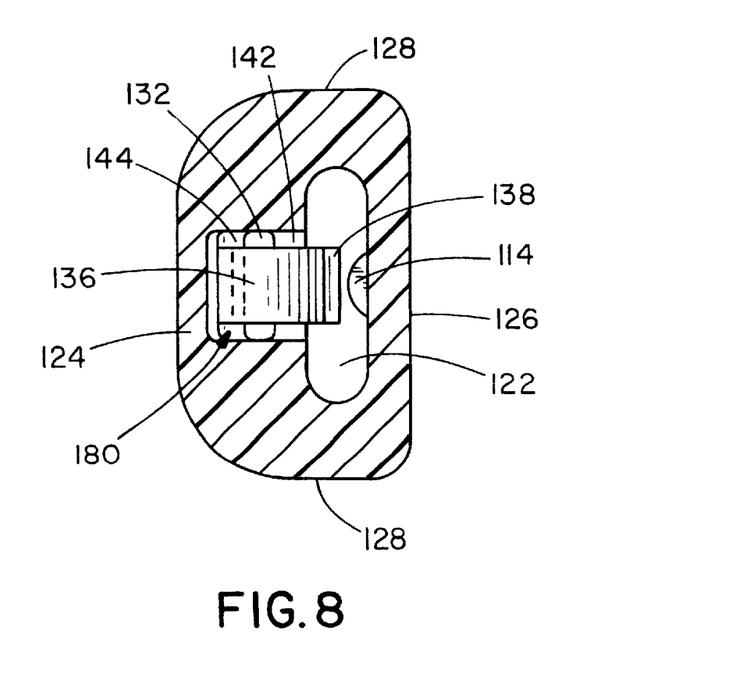
FIG. 8 is a cross-sectional view of the locking head of FIG. 7 taken along line 8—8.
Figure 9:
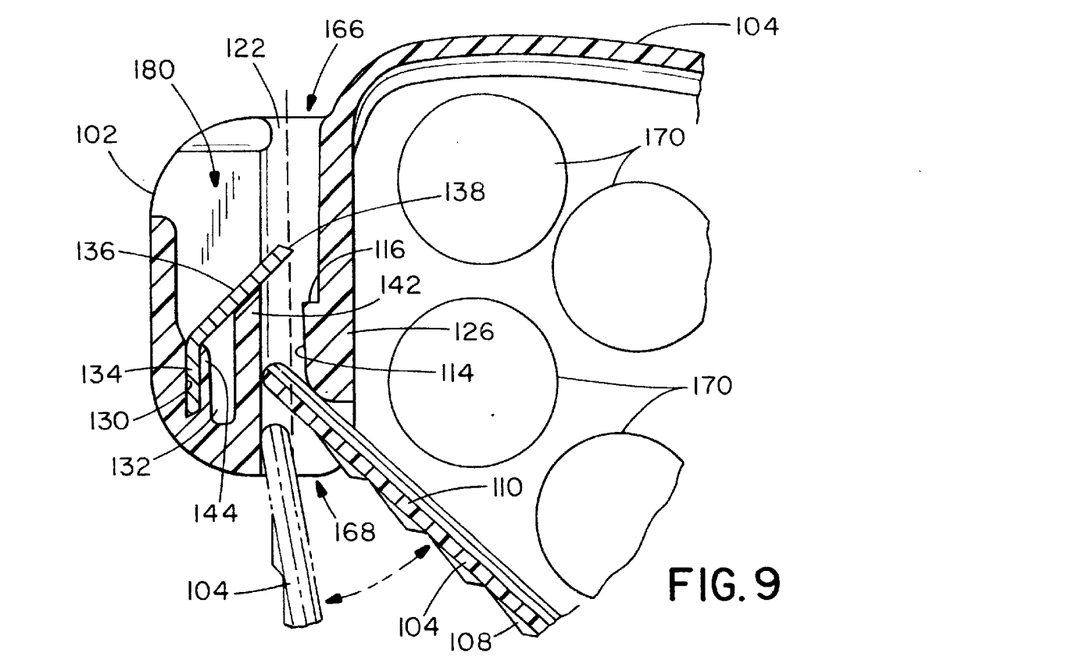
FIG. 9 is a cross-section view of the cable tie showing an initial feeding of the strap into a strap accepting channel.

Use of the cable tie according to the invention will be described with reference to FIGS. 7–15. FIG. 7 shows initial insertion of leading end 112 of strap 104 into leading end 168 of strap accepting channel 122. As shown leading end 112 can be inserted over a broad range of entrance angles. Insertion continues as shown in FIGS. 8–9 while leading end 112 begins to extend beyond strap exit end 166 of strap accepting channel 122. At such time, a user may switch from pushing the strap through to pulling the strap through the strap accepting channel by now grasping leading end 112 and pulling. As best shown in FIG. 9, strap 104 may be self-aligned in the strap accepting channel by the mating of central groove 110 around support guide 114.

Figure 10:
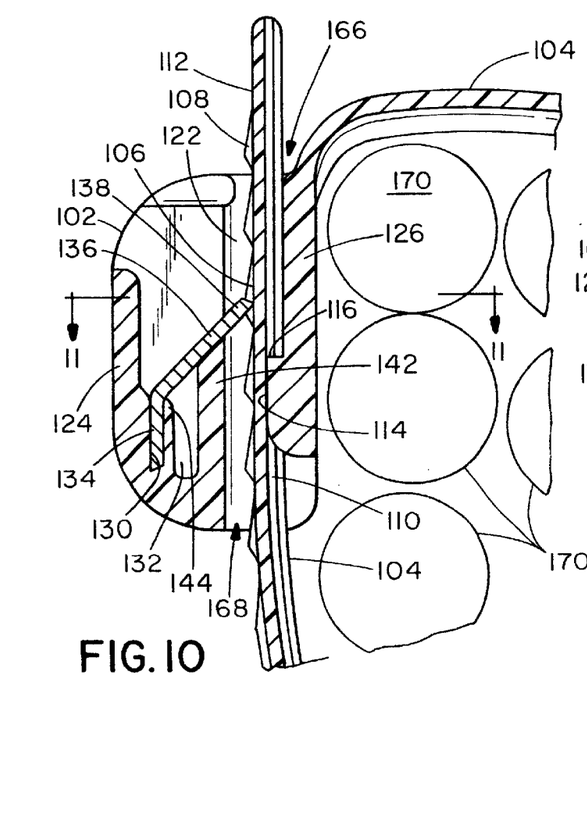
FIG. 10 is a cross-sectional view of the cable tie showing an intermediate feeding position where a leading end of the strap has passed the locking device.
Figure 11:
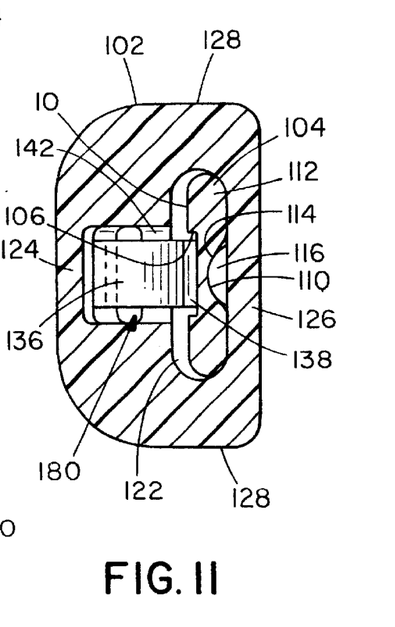
FIG. 11 is a cross-sectional view of the locking head and strap of FIG. 10 taken along line 10—10.

As shown in FIGS. 10–11, further tightening of the cable tie occurs until strap 104 is sufficiently tight around an object that is being constrained, such as cable bundle 170. During the insertion of leading end 112 and the further tightening, free end 138 of metal locking device 136 flexes away from the cantilever fulcrum point 142 into metal locking device receiving cavity 180 due to resiliency of the metal and the cantilever design. This flexing is further increased by provision of recessed pocket 132 and sizing of support membrane 144, which allow for slight rotation of fixed end 134 of metal locking device 136 caused by upward forces acting on free end 138. This results in a controlled movement of fixed end 134 as shown in FIG. 10 which lowers insertion force.

Figure 12:
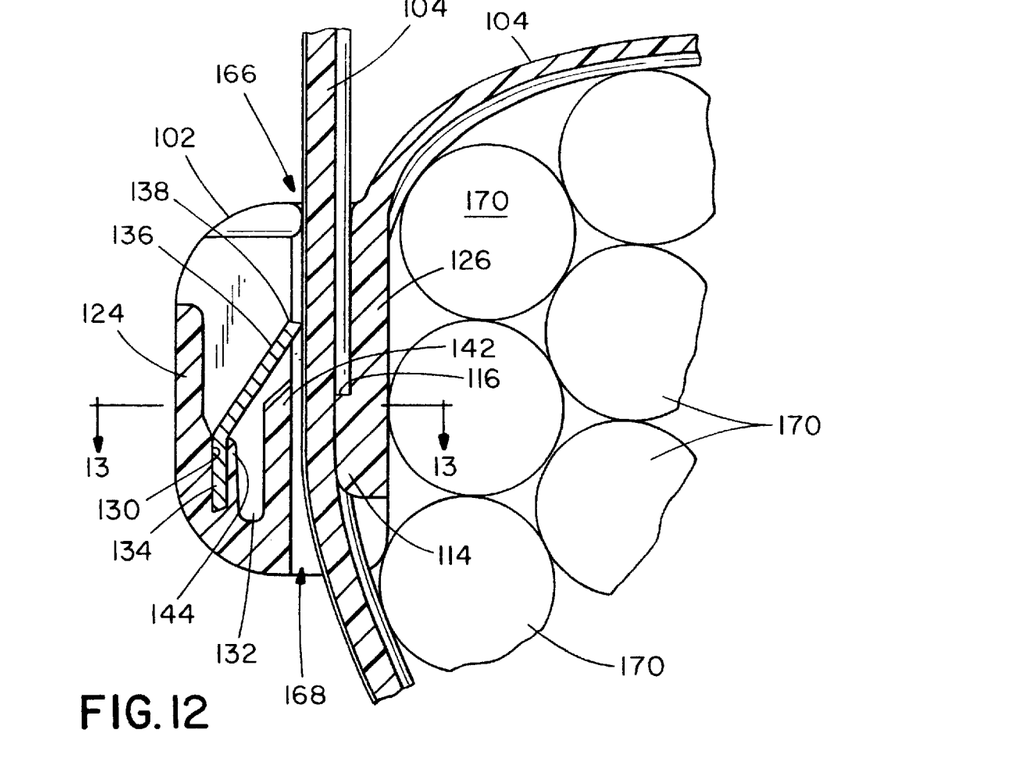
FIG. 12 is a cross-sectional view of the cable tie in a further feeding position where the strap is still being feed through the strap accepting channel in a feeding direction.
Figure 13:
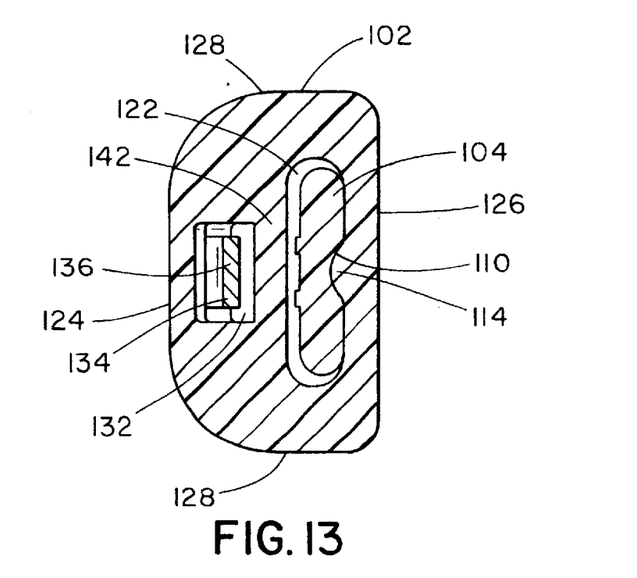
FIG. 13 is a cross-sectional view of the locking head and strap of FIG. 12 taken along line 13—13.
Figure 14:
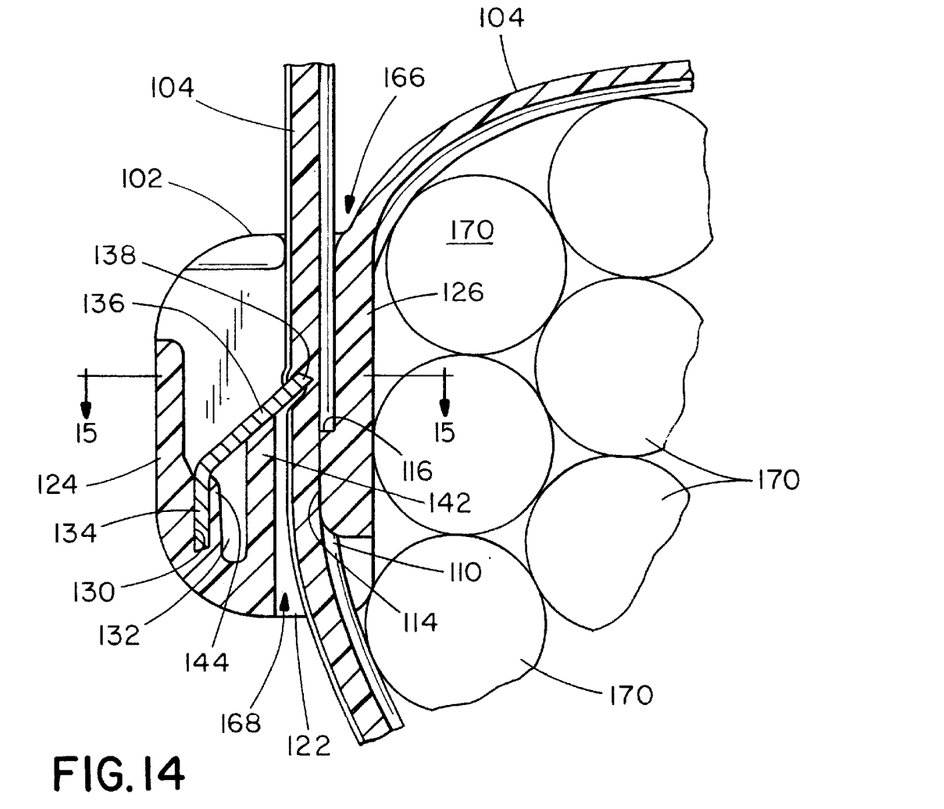
FIG. 14 is a cross-sectional view of the cable tie after the strap has been fully inserted and the strap has been partially retracted in a reverse direction, with the locking device being bent down and partially pierced into the strap to resist removal of the cable tie.
Figure 15:
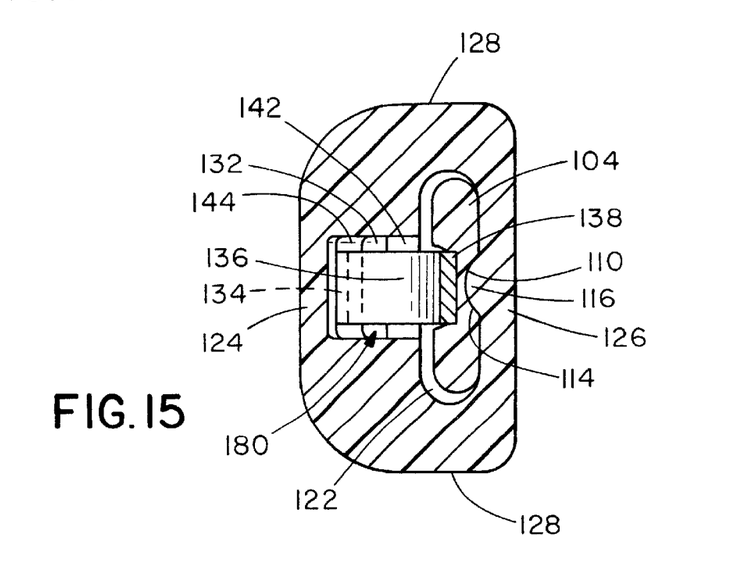
FIG. 15 is a cross-sectional view of the locking head and strap of FIG. 14 taken along line 15—15.
Figure 16:
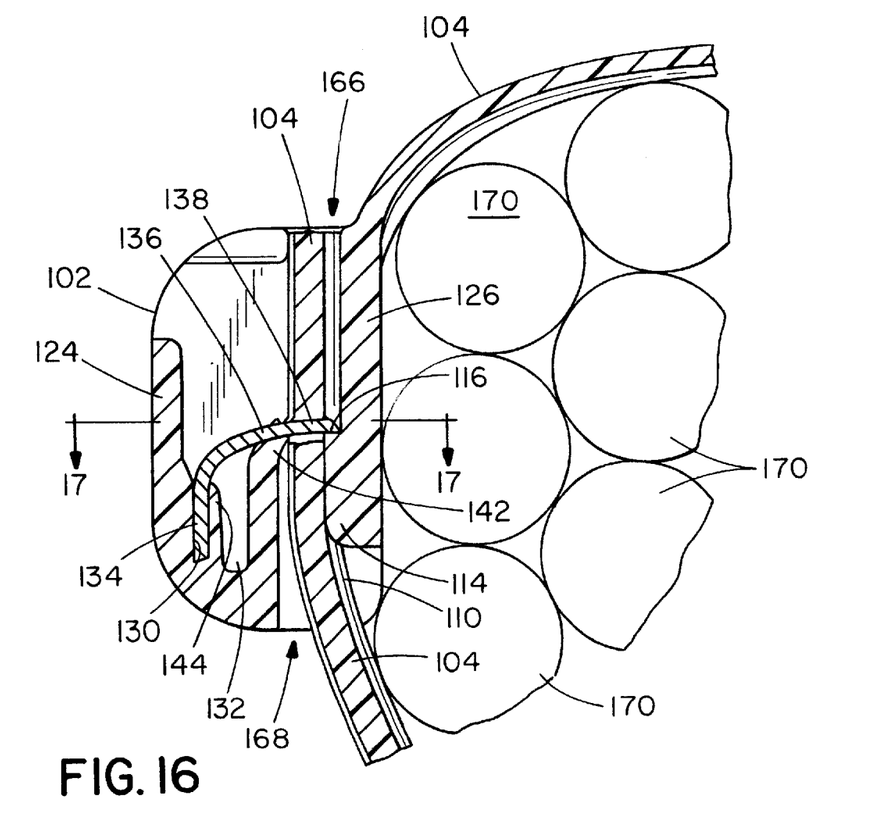
FIG. 16 is a cross-sectional view of the cable tie after the locking device has been fully bent so as to completely pierce the strap and have its leading free end supported on a ledge within the strap accepting channel.
Figure 17:
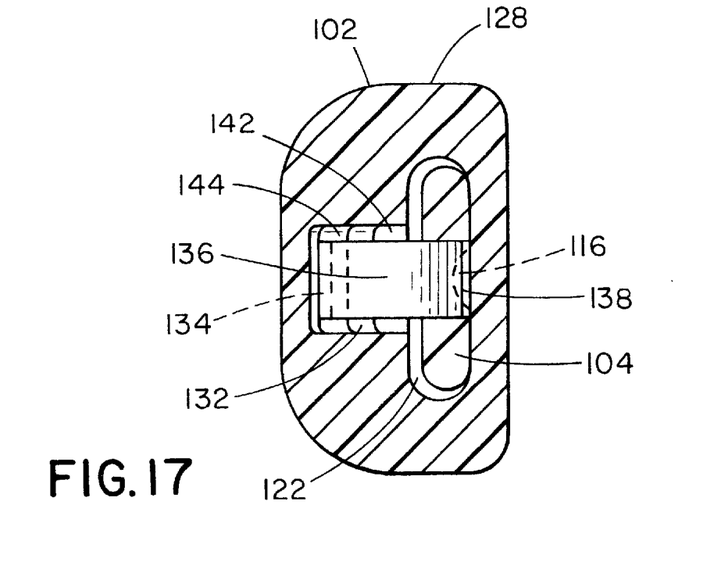
FIG. 17 is a cross-sectional view of the locking head and strap of FIG. 16 taken along line 17—17.

Upon release of the strap or through application of a withdrawal force on the strap, a sharpened end of the metal locking device 136 begins to pierce strap 104 as shown in FIGS. 12–13. Continued forces of sufficient strength will cause further deflection of free end 138 about fulcrum point 142. If sufficient force is applied, locking device 136 may filly pierce strap 104. At this time, free end 138 upon further bending will ultimately rest upon ledge 116 to resist further deflection.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

1. A cable tie, comprising:
   a strap including a first end and a free end;
   a locking head secured to the first end of the strap, the locking head including an end wall, an inner wall and side walls that define a strap accepting channel in the head, the strap accepting channel having a strap entry end and a strap exit end, the locking head further including a metal locking device receiving cavity adjacent to and open toward the strap exit end of the locking head;
   a metal locking device mounted within the metal locking device receiving cavity by having a fixed end mounted to the end wall of the locking head and a free end positioned within the strap accepting channel,
   wherein the locking head includes a recessed pocket, provided between the fixed end of the metal locking device and the strap accepting channel, that opens to the metal locking device receiving cavity, and the recessed pocket defines a thinned support membrane immediately adjacent the fixed end of the metal locking device that allows for slight rotation of the fixed end toward the strap accepting channel when feeding the strap through the strap accepting channel, which reduces strap insertion force.

2. The cable tie of claim 1, wherein the recessed pocket extends toward the strap entry end of the locking head beyond the fixed end of the metal locking device.

3. The cable tie of claim 2, wherein the recessed pocket extends entirely through the end wall to form a through hole.

4. The cable tie of claim 1, wherein the recessed pocket extends parallel with the strap accepting channel.

5. The cable tie of claim 4, wherein the recessed pocket has a substantially uniform thickness.

6. The cable tie of claim 4, wherein the fixed end of the metal locking device is substantially parallel with the recessed pocket.

7. The cable tie of claim 1, wherein the support membrane has a predetermined thickness that allows for controlled deflection.

8. The cable tie of claim 7, wherein the recessed pocket has a thickness that accommodates the amount of deflection.

9. The cable tie of claim 7, wherein the recessed pocket has a thickness that becomes closed upon application of insertion force load.

10. A cable tie, comprising:
    a strap including a first end and a free end;
    a locking head secured to the first end of the strap, the locking head including an end wall, an inner wall and side walls that define a strap accepting channel in the head, the strap accepting channel having a strap entry end and a strap exit end, the locking head further including a metal locking device receiving cavity adjacent to and open toward the strap exit end of the locking head;
    a metal locking device mounted within the metal locking device receiving cavity by having a fixed end mounted to a support slot of the end wall of the locking head and a free end positioned within the strap accepting channel,
    wherein the locking head includes a recessed pocket, provided between the fixed end of the metal locking device and the strap accepting channel, wherein the recessed pocket is spaced from and substantially parallel to the strap accepting channel.

11. The cable tie of claim 10, wherein the recessed pocket opens to the metal locking device receiving cavity.

12. The cable tie of claim 11, wherein the recessed pocket extends toward the strap entry end of the locking head beyond the fixed end of the metal locking device.

13. The cable tie of claim 12, wherein the recessed pocket has a substantially uniform thickness.

14. The cable tie of claim 12, wherein the fixed end of the metal locking device is substantially parallel with the recessed pocket.

15. The cable tie of claim 14, wherein the recessed pocket has a thickness that accommodates the amount of deflection.

16. The cable tie of claim 14, wherein the recessed pocket has a thickness that becomes closed upon application of insertion force load.

17. The cable tie of claim 10, wherein the recessed pocket opens to the strap entry end of the locking head.

18. The cable tie of claim 17, wherein the recessed pocket extends entirely through the end wall to form a through hole.

19. The cable tie of claim 10, wherein the support membrane has a predetermined thickness that allows for controlled deflection.

* * * * *